United States Patent [19]

Kondo et al.

[11] 3,844,324

[45] Oct. 29, 1974

[54] ANTI-SKID TRACTION DEVICE FOR VEHICLE TIRES

[75] Inventors: Yoshikazu Kondo, Yokohama; Harumichi Yamazaki, Tokyo; Akito Akinaga, Yokohama, all of Japan

[73] Assignee: Bridgestone Tire Company Limited, Tokyo, Japan

[22] Filed: Oct. 29, 1973

[21] Appl. No.: 410,366

[30] Foreign Application Priority Data
Mar. 5, 1973 Japan.............................. 48-25837
Nov. 7, 1972 Japan............................ 47-111364

[52] U.S. Cl.................. 152/239, 152/219, 152/231, 152/241
[51] Int. Cl. ...................... B60c 27/06, B60c 27/10
[58] Field of Search.... 152/213 R, 213 A, 217-219, 152/221, 223, 225, 231, 239, 240, 241

[56] References Cited
UNITED STATES PATENTS

| 1,244,080 | 10/1917 | Reed | 152/219 |
|---|---|---|---|
| 2,459,751 | 1/1949 | Skromme | 152/221 |
| 2,547,007 | 4/1951 | Horner et al. | 152/213 R |
| 3,092,163 | 6/1963 | Bunker, Jr. et al. | 152/221 |
| 3,125,148 | 3/1964 | Fox | 152/221 |
| 3,192,983 | 7/1965 | Dalton et al. | 152/221 |

*Primary Examiner*—Drayton E. Hoffman
*Attorney, Agent, or Firm*—Eric H. Waters

[57] ABSTRACT

An anti-skid traction device for a vehicle tire which comprises a flexible annular tread member circumferentially extensible and having a circumferential length less than that of the vehicle tire, the outer side of the tread member being formed into a plurality of ringlets, a flexible inner side annular member circumferentially non-extensible and having a circumferential length greater than twice the sum of the axial width of the vehicle tire and the diameter of the vehicle tire, the inner side annular member being connected with the inner side portion of the annular tread member in coaxial relationship, a flexible ring member circumferentially extensible and having a circumferential length less than that of the vehicle tire, the ring member being so connected or integral with the tread member as to cross all of the ringlets and interconnect adjacent ringlets, and an outer side chain assembly connected to all of the ringlets for radially inwardly drawing all of the ringlets so as to tightly mount the anti-skid traction device on the vehicle tire.

8 Claims, 7 Drawing Figures

PATENTED OCT 29 1974 3,844,324

ANTI-SKID TRACTION DEVICE FOR VEHICLE TIRES

The present invention relates in general to an anti-skid traction device and in particular is concerned with a flexible anti-skid traction device which can be readily applied to a mounted vehicle tire.

Anti-skid traction means for vehicle tires have heretofore generally taken the form of metallic tire chains which comprise a pair of annular side chains having free ends connected by parallel cross-chains. These tire chains have to be draped over the top of the vehicle tire and the loose ends of each of the side chains clamped together. As is well known, to mount the tire chains on vehicle tires requires effort and skillful manipulation of the operator. Therefore, the operator tends to leave the tire chain mounted on the vehicle tire even when the vehicle travels on a road whose surface is not soft or not covered by snow or ice. This causes a clamorous sound to be generated from the tire chain and the road surface due to contact between the tire chain and the road surface. Furthermore, this causes either the tire chain to become worn or damaged, or the road surface to be undesirably damaged in the case of a paved road.

In order to overcome the above-stated problem, various attempts have heretofore been made to construct anti-skid traction means from a molded material. However, the known molded type devices can not sufficiently tightly conform to the vehicle tires. Furthermore, these molded type devices could not always produce a sufficiently large tractive force for a road vehicle.

It is accordingly a principal object of the present invention to provide a new and improved anti-skid device of molded type which can be tightly mounted on a vehicle tire.

It is another object of the present invention to provide a new and improved anti-skid device of molded type which can produce a sufficiently large tractive force for a vehicle tire.

According to the present invention, it has been found that the above objects are achieved by an anti-skid traction device for a vehicle tire, which comprises a flexible annular tread member which is circumferentially extensible and has a circumferential length less than the circumferential length of the vehicle tire, the outer side portion of said annular member being formed into a plurality of ringlets, a flexible inner side annular member circumferentially non-extensible and having a circumferential length greater than twice the sum of the axial width of the vehicle tire and the diameter of the vehicle tire but less than the circumferential length of the vehicle tire, the flexible inner side annular member being connected with the inner side end of the annular tread member in coaxial relationship, a flexible ring member circumferentially extensible and having a circumferential length less than that of the vehicle tire, the flexible ring member crossing all of the ringlets and interconnecting adjacent ringlets, and an outer side chain assembly connected to all of the ringlets for drawing all of the ringlets radially inwardly.

For a full understanding of the invention, a detailed description of preferred embodiments thereof will now given in connection with the accompanying drawings and the features forming the invention will be specifically pointed out in the claims.

In the drawings.

In the drawings, like reference characters are intended to refer to identical or similar elements throughout the several views.

Figure 1:
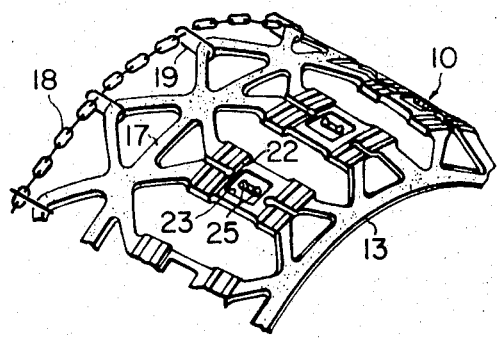
FIG. 1 is a fragmentary perspective view of an anti-skid device according to the present invention.
Figure 2:
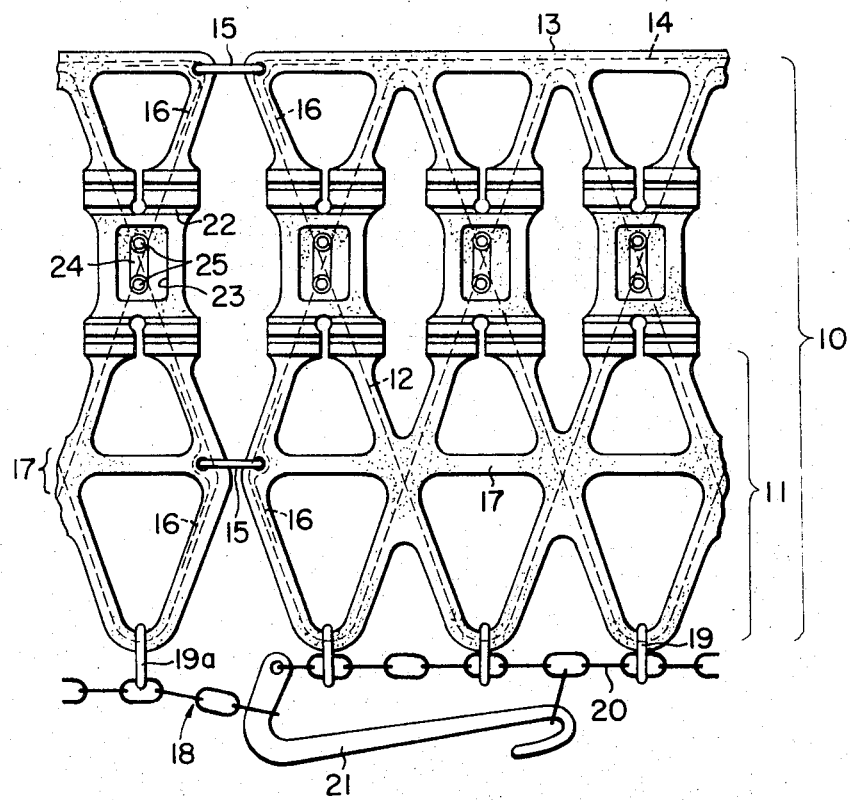
FIG. 2 is an enlarged fragmentary plan view of one embodiment of the present invention.

Referring now to the drawings and more specifically to FIGS. 1 and 2, therein is shown an anti-skid device according to the invention, which comprises a flexible annular tread member 10 made of molded plastic material, such as rubber, or any one of various standard types of synthetic resins, etc. The annular tread member 10 is circumferentially extensible and has a circumferential length less than the circumferential length of the vehicle tire on which the anti-skid device is to be mounted. The outer or outboard side portion of the annular tread member 10 is formed into a plurality of ringlets 11. The treads of the annular tread portion 10 are preferably arranged diagonally in alternate directions at the operative portion or foot print zone of the vehicle tire. One or more inextensible cords 12 are embedded in the treads of the annular tread member 10 so as to reinforce the treads. Each cord 12 is preferably a steel cord or a bundle of metallic cords surrounded by rubber of shore A hardness of from 70 to 90. A flexible inner or inward side annular member 13 is connected or integral with the inner or inward side portion of the flexible annular tread portion 10 in coaxial relationship with respect to each other. The inner side member 13 is, in this example, made of the same material as the annular tread member 10 but is non-extensible because of the presence of from one or or more non-extensible cords 14 embedded therein. The non-extensible cords 14 may be integral with some of the cords 12. Even when the cords 14 are disconnected from the cords 12, the cords may be made of the same material as the cords 12. The inner side member 13 has a circumferential length greater than twice the sum of the axial length of the vehicle tire and the diameter of the vehicle tire but less than the circumferential length of the vehicle tire. Both the annular tread member 10 and the annular inner side member 13 are, in this case, formed discontinuously and annularly arranged by means of a pair of connectors 15 each having both ends respectively engaged with the extreme ends of either the tread member 10 or the inner side member 13. This contributes to simplified configurations of the dies to be used in a process for molding the tread and inner side members 10 and 13. Subsidiary cords 16 may be embedded in the extreme end portion of the annular tread and inner side members 10 and 13, if preferred. It will be understood that the inner side one of the connectors 15 may be arranged to be readily disengaged from the inner side member 13 to open the member 13 for the sake of easy detachment of the anti-skid device from the vehicle tire. A flexible ring member 17 is so connected or preferably integral with the annular tread member 10 as to cross all of the ringlets 11 and interconnect adjacent ringlets. The flexible ring member 17 is circumferentially extensible and has a circumferential length less than that of the vehicle tire. An outer side chain assembly 18 is so connected to all of the ringlets 11 as to be capable of being tightly stretched for radially inwardly drawing all of the ringlets 11. The chain assembly 18, in this example, includes a plurality of rings 19 each loosely coupled with a respective one of the ringlets 11, and a chain 20 loosely passing through all of rings 19 and having a releasable fastener 21 at its separable ends. One or more links of the chain 20 may be arranged to respectively join one or more of the rings 19, as exemplified by a ring 19a, if desired.

Each of central node or cross portions of the treads of the annular tread member 10 is, in this embodiment, formed generally rectangular. A recess 22 is formed in the outer wall of each of the rectangular node portions and another recess 23 is formed in each recess 22. A seat member 24 is fastened in each recess 23, on which a pair of spike members 25 is secured. The spike members 25 are effective for providing a sufficiently large tractive force even when the vehicle travels on an icy road.

Figure 3:
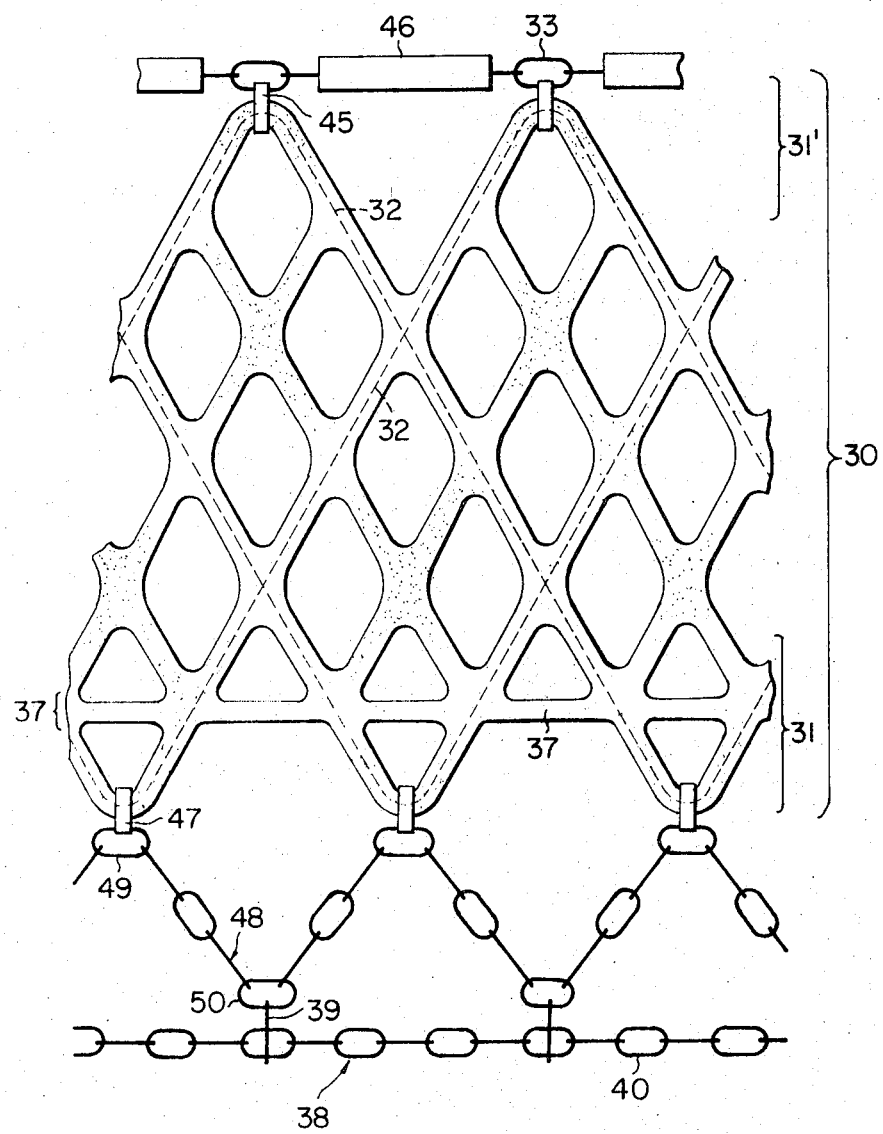
FIG. 3 is an enlarged fragmentary plan view of another embodiment of the present invention.

In FIG. 3, there is shown another anti-skid device according to the invention, which comprises a flexible annular tread member 30 made of molded plastic material the same as that of the tread member 10 of the embodiment of FIG. 1. The annular tread member 30 is circumferentially extensible and has a circumferential length less than the circumferential length of the vehicle tire. As apparent from the figure, the tread pattern of the annular tread member 30 is somewhat different from that of the annular tread member 10 but the functions of the tread members 10 and 30 are substantially the same. The tread member 30 has its outer side portion formed into a plurality of ringlets 31. In this embodiment, the inner side portion of the tread member 30 is formed similarly to the outer side portion and has a plurality of ringlets 31'. One or more non-extensive cords 32 are embedded in the treads of the annular tread member 30 so that the tread member 30 is reinforced. Each of the cords 32 is made of the same material as that of the cords 12 of the embodiment of FIG. 1. A flexible annular inner or inward member 33 made of a chain is connected with the tread member 30 by means of rings 45 each coupled with a respective ringlet 31'. The annular member 33 has telescoped over it a plurality of preferably tubular or sleeve-like non-metallic members 46 so as to protect the sidewall of the vehicle tire from being damaged by the member 33. The annular inward member 33 is, of course, non-extensible and has a circumferential length greater than twice the sum of the axial length of the vehicle tire and the diameter of the vehicle tire but less than the circumferential length of the vehicle tire. Although not being clearly shown in this figure, the annular tread member 30 may be molded to be entirely circumferentially continuous or to be discontinuous with two ends connected by a suitable means. The inner side member 33 may be preferably formed to be separable for the sake of easy detachment of the entire device from the vehicle tire. A flexible ring member 37 is so connected or preferably integral with the annular tread member 30 as to cross all of the ringlets 31 and interconnect adjacent ringlets 31. The flexible ring member 37 is made of the same material as the tread member 30 and is circumferentially extensible. The flexible ring member 37 has a circumferential length less that of the vehicle tire. An outer side chain assembly 38 is so connected to all of the ringlets 31 as to be capable of being tightly stretched for radially inwardly drawing all of the ringlets 31 when the anti-skid device is to be tightly fitted on the tire. The outer chain assembly 38 includes a plurality of rings 47 each coupled with a respective ringlets 31, and a loose or slack annular chain 48 having a circumferential length greater than that of the vehicle tire. The loose annular chain 48 includes a first group of preferably equidistantly spaced links 49 each coupled with one of the rings 47. The loose annular chain 48 further includes a second group of links 50 each preferably equidistantly spaced from the adjacent two of the first group of links and loosely coupled with each of a plurality of second rings 39. The chain assembly 38 further includes a chain 40 loosely coupled with all of the rings 39 and having a releasable fastener (not shown) at its separable ends.

Figure 4:
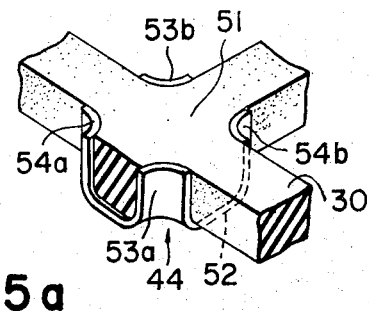
FIG. 4 is a fragmentary perspective view of the embodiment shown in FIG. 3.

As shown in FIG. 4, another type of spike member 44 may be mounted on each node or cross portion 51 of the tread member 30 in order to improve the tractive performance of the anti-skid device. The spike member 44 has a flat bottom portion 52 overlying the inner surface of the node 51 and two pairs of elongated portions 53a, 53b and 54a, 54b respectively integral with the flat bottom portion 52 and extending from the bottom portion 52 in the radial direction of the tread member 30. The spike member 44 is so formed that each pair of elongated portions faces each other and tightly pinches the node portion 51. The elongated portions of the spike member 44 may be formed to have substantially the same height as the thickness of the tread member 30 or, in some cases, to have a height slightly higher than the thickness of the tread member 30 in order to further raise the tractive performance of the anti-skid traction device. The spike member may be made of a suitable synthetic resin but preferably is made of steel.

It is to be noted that the spike member 44 can be applied to the tread member 10 of FIG. 1 by slightly modifying its construction although described above in conjunction with the tread member 30 of FIG. 2.

Figure 5A:
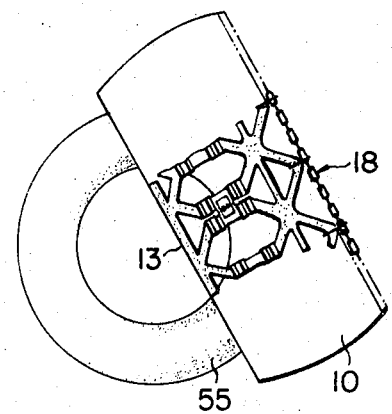
FIGS. 5a, 5b and 5c are diagrams showing successive steps in the process for mounting the anti-skid device according to the present invention on a vehicle tire.
Figure 5B:
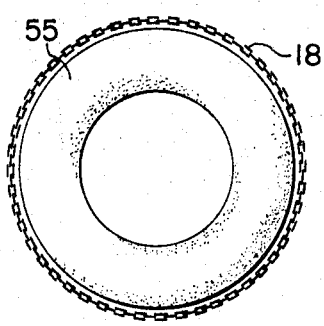
Figure 5C:
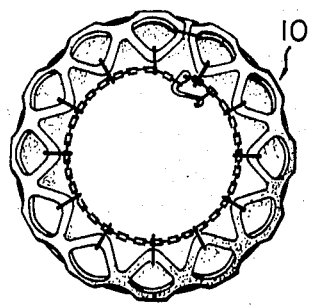

Referring now to FIGS. 5a, 5b and 5c, the successive stages in a preferred process for applying or mounting the anti-skid device of the invention on a vehicle tire will be explained hereinbelow.

Only a vehicle tire 55 is shown in these figures to aid in the illustration and the hub cap, axle, tire spokes, fender, etc. are omitted for the purpose of illustration. However, the principle and stages of operation would be the same on an assembled vehicle tire.

To install the inventive anti-skid traction device on the left rear wheel of a motor vehicle (assuming the tire 55 of FIGS. 5a through 5c to be the left rear wheel of a motor vehicle with the side facing the observer of the drawings being the outside surface of the tire), the operator first lifts up the tire 55 by jacking or the like and makes the anti-skid traction device to couple with the top portion of the tire 55 as shown in FIG. 5a. Then the operator urges the anti-skid traction device downwardly to slide over the peripheral surface of the tire 55 until the inner side member 13 passes over the central portion of the wheel.

In the next step, the operator applies a turning force to the device by use of both hands so as to urge the device to rotate about a line passing through the central point of the tire until the device assumes the position as shown in FIG. 5b. It is now to be noted that since the ringlets 11 are connected with one another by the flexible ring 17, the operator can smoothly rotate the traction device in this steP without unwanted damage or injury of the device.

Then, the chain assembly 18 is tightly stretched so as to radially inwardly draw all of the ringlets 11 whereby the traction device is tightly attached or fitted on the tire 55 as shown in FIG. 5c. It is also to be noted that since the outer side of the tread member is formed into the ringlets 11, the device can desirably accommodate to the tire 55.

It will be now appreciated that since the annular tread member 10 has a circumferential length less than that of the tire 55, the tread member 10 is forced to extend thereby to tightly engage the tire 55.

When it is desired to remove the anti-skid traction device from the tire 55, the operation described above is substantially reversed after, of course, releasing the fastener 21 to permit the chain assembly to clear the tire 55. It should be noted, noted in this instance, that the flexible ring 17 is effective for smooth detachment of the anti-skid traction device from the tire.

Although being described above in conjunction with the anti-skid traction device of FIG. 2, it will be readily understood that substantially the same process can be employed for the anti-skid traction device of FIG. 3.

Obviously many modifications and variations of the present invention are possible in the light of the above teachings. It is, therefore, to be understood that within the scope of the appended claims, the invention may be practiced otherwise than as specifically described.

What is claimed is:

1. An anti-skid traction device for a vehicle tire, which comprises:

a flexible annular tread member circumferentially extensible and having a circumferential length smaller than the circumferential length of the vehicle tire, the outer side portion of said annular tread member being formed into a plurality of ringlets;

a flexible inner side annular member circumferentially non-extensible and having a circumferential length greater than twice the sum of the axial width of said vehicle tire and the diameter of said vehicle tire but less than the circumferential length of said vehicle tire, said flexible inner side annular member being connected with the inner side end of said annular tread member in coaxial relationship therewith;

a flexible ring member circumferentially extensible and having a circumferential length less than that of said vehicle tire, said flexible ring member crossing all of said ringlets and interconnecting adjacent ringlets; and an outer side chain assembly connected to all of said ringlets for drawing all of said ringlets radially inwardly.

2. An anti-skid traction device as set forth in claim 1, in which said assembly includes a plurality of rings each coupled with one of said ringlets, and a chain loosely passing through all of said rings and having separable ends with a releasable fastener at said separable ends.

3. An anti-skid traction device as set forth in claim 1, in which said chain assembly includes a plurality of first rings each coupled with one of said ringlets, a loose annular chain having a length greater than the circumferential length of said vehicle tire and including a first group of links generally equidistantly spaced from each other and each coupled with each of said rings, a plurality of second rings respectively coupled with a second group of links of said loose annular chain, and a chain loosely passing through all of said second rings and having separable ends with a releasable fastener at said separable ends.

4. An anti-skid traction device as set forth in claim 1, which further comprises a plurality of cords embedded in said annular tread member and extending from the inner side portion of said annular tread member to the outer side portion of said annular tread member.

5. An anti-skid traction device as set forth in claim 4, in which each of said cords is made of a bundle of steel cords surrounded by rubber of shore A hardness of from 70 to 90.

6. An anti-skid traction device as set forth in claim 1, which further comprises a plurality of spike members mounted on the central periphery of said annular tread member.

7. An anti-skid traction device as set forth in claim 6, in which each of said spike members comprises a plate member having a flat bottom portion overlying the inner surface of a node portion of said tread member and two pairs of elongated portions respectively integral with said flat bottom portion and extending from said flat bottom portion in the radial direction of said tread member, said pairs of elongated portions tightly pinching said node portion.

8. An anti-skid traction device as set forth in claim 7, in which said plate member is made of steel.

* * * * *